United States Patent
O'Brien

(10) Patent No.: US 10,445,532 B2
(45) Date of Patent: Oct. 15, 2019

(54) USB MEDIA STORAGE DEVICE

(71) Applicant: Joseph O'Brien, Yuba City, CA (US)

(72) Inventor: Joseph O'Brien, Yuba City, CA (US)

( * ) Notice: Subject to any disclaimer, the term of this patent is extended or adjusted under 35 U.S.C. 154(b) by 161 days.

(21) Appl. No.: 15/423,577

(22) Filed: Feb. 2, 2017

(65) Prior Publication Data

US 2017/0220824 A1     Aug. 3, 2017

Related U.S. Application Data

(60) Provisional application No. 62/388,600, filed on Feb. 2, 2016.

(51) Int. Cl.
| | |
|---|---|
| *H04N 7/16* | (2011.01) |
| *G06F 17/30* | (2006.01) |
| *G06F 7/04* | (2006.01) |
| *G06F 21/85* | (2013.01) |
| *G06F 21/79* | (2013.01) |
| *G06F 13/42* | (2006.01) |
| *H05K 5/02* | (2006.01) |

(52) U.S. Cl.
CPC .......... *G06F 21/85* (2013.01); *G06F 13/4282* (2013.01); *G06F 21/79* (2013.01); *H05K 5/0278* (2013.01); *G06F 2221/031* (2013.01)

(58) Field of Classification Search
CPC ............... G06F 13/4282; G06F 21/79; G06F 2221/031; H05K 5/0278
USPC ............................................................ 726/32
See application file for complete search history.

(56) References Cited

U.S. PATENT DOCUMENTS

| | | | | |
|---|---|---|---|---|
| 7,422,454 B1 * | 9/2008 | Tang | ................. | H01R 13/6658 439/131 |
| 9,037,874 B2 * | 5/2015 | Ito | ........................... | G06F 21/10 713/193 |
| 2001/0028615 A1 * | 10/2001 | Carson | .................. | G11B 7/013 369/47.12 |
| 2007/0127219 A1 * | 6/2007 | Ho | ..................... | H01R 13/4538 361/736 |
| 2008/0280490 A1 * | 11/2008 | Nguyen | .............. | G06F 12/1416 439/607.01 |
| 2009/0316368 A1 * | 12/2009 | Hiew | .................... | G06F 1/1632 361/737 |
| 2010/0267259 A1 * | 10/2010 | Sun | .................. | G06K 19/07732 439/131 |
| 2010/0281209 A1 * | 11/2010 | Ni | .................... | G06K 19/07732 711/103 |
| 2010/0321878 A1 * | 12/2010 | Huang | ................. | G06K 19/077 361/679.31 |
| 2011/0059636 A1 * | 3/2011 | Ni | ........................ | G06K 19/041 439/131 |
| 2016/0030818 A1 * | 2/2016 | Dean | ...................... | A63B 57/50 473/408 |

OTHER PUBLICATIONS

Dung V. Pham; Threat Analysis of Portable Hack Tools from USB Storage Devices and Protection Solutions; people.eng.unimelb.edu. au; p. 1-54 (Year: 2010).*

* cited by examiner

*Primary Examiner* — Monjur Rahim
(74) *Attorney, Agent, or Firm* — William C. Milks, III

(57) ABSTRACT

A USB media storage device includes a housing and USB flash drive mounted in the housing. A faceplate is mounted to the housing to indicate the content stored on the USB flash drive. The media stored on the USB flash drive is copy protected.

5 Claims, 4 Drawing Sheets

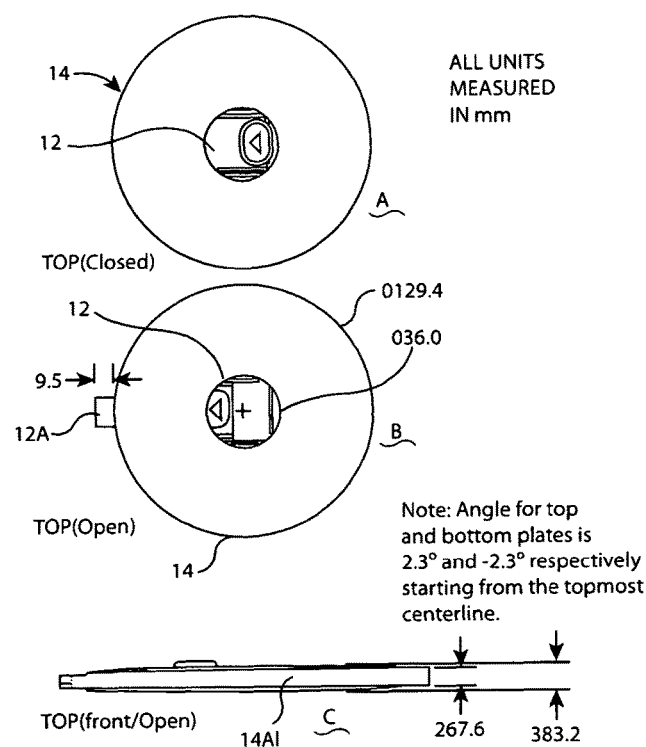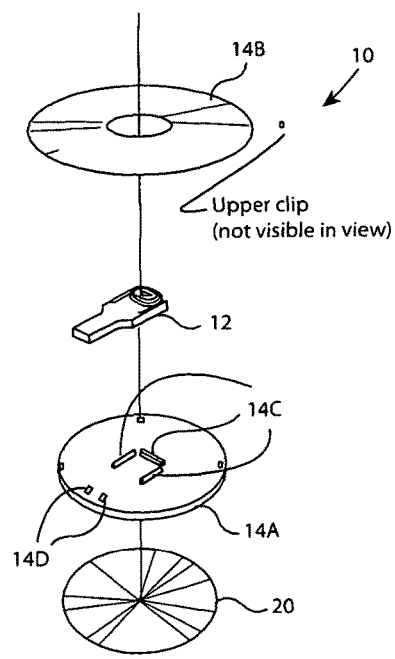
Fig. 4
Fig. 3

TO THE LEFT USB CHIP. (BELOW)
ENLARGED VIEWS OF THE TOP AND
BOTTOM PIECES' CLASPING POINTS

USB MEDIA STORAGE DEVICE

CROSS-REFERENCE TO RELATED PATENT APPLICATION

This application claims the benefit of U.S. Provisional Patent Application No. 62/388,600 filed on Feb. 2, 2016, the disclosure of which is hereby incorporated herein in its entirety by this reference.

BACKGROUND OF THE INVENTION

1. Field of the Invention

The present invention relates to the field of entertainment. Generally, the present invention relates to storage of entertainment media and, more particularly, to portable storage of entertainment media in digital format to be accessed for playing the entertainment media on a digital media player.

2. Description of the Prior Art

Over the past few decades, the trend has been to store entertainment media in digital format for playback by a digital media player. For example, digital entertainment media has been stored on compact discs (CDs) and digital versatile discs (DVDs), which are either read only or both writable and readable. In either case there is the risk of piracy by unauthorized copying of the entertainment media such as audio or video entertainment stored on CDs or DVDs. More recently, Universal Serial Bus (USB) flash drives, also known as thumb drives, are used to store digital data including entertainment media. The USB flash drives interface with a USB port on a digital media player such as a computer or MP3 player, to play the entertainment media. Entertainment media on USB flash drives is also susceptible to unauthorized copying.

Additionally, USB flash drives typically have a small size and are consequently easily misplaced or lost. Moreover, USB flash, drives are generally nondescript devices that do not provide for external identification of the media stored on the devices.

SUMMARY OF THE INVENTION

The present invention has as an object to provide a USB media storage device that prevents unauthorized copying of media such as entertainment media stored on the device. Also, the present invention has as an additional object to enable an external indication of the media such as entertainment media stored on the device.

Various examples of the USB media storage device in accordance with the present invention provide copy protection for the media stored on the device. Additionally, the USB media storage device comprises a housing for the USB flash drive to protect the USB flash drive and decrease the risk of misplacing or losing the device. Preferably, a faceplate is mounted to the housing to indicate the content of the media stored on the device.

BRIEF DESCRIPTION OF THE DRAWING

The various examples of the present invention will be described in conjunction with the accompanying figures of the drawing to facilitate an understanding of the present invention. In the drawing:

FIG. 3 is an exploded view of the USB media storage device shown in FIG. 1.

FIG. 4 shows top and side elevational views of the USB media storage device shown in FIG. 1.

DETAILED DESCRIPTION OF THE PREFERRED EXAMPLES

Various examples of the present invention provide a new age read only device usable for storage of all digital entertainment media such as music, e-books, movies, video, games, or other media in digital format. The device is configured to stop piracy and create an improved digital entertainment media storage device for all listening and viewing needs. This device has a long life, longer than the leading brand compact disc.

Figure 1:
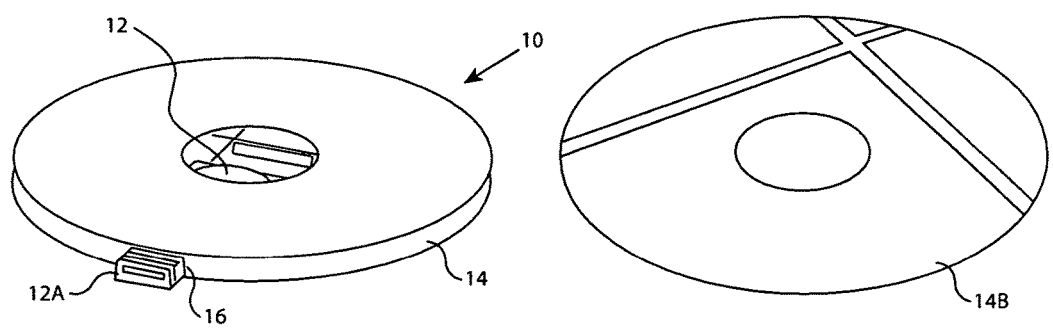
FIG. 1 is an isometric view of the USB media storage device in accordance with an example of the present invention.

FIG. 1 is an isometric view of the USB media storage device 10 in accordance with a preferred example of the present invention. As shown in FIG. 1, the USB media storage device 10 comprises a USB flash drive 12 disposed in a housing 14. FIG. 1 shows a USB connector 12A comprising the USB flash drive 12 extending through a slot 16 in the housing 14 enabling the USB flash drive 12 to be connected to a digital media player (not shown).

Figure 2:
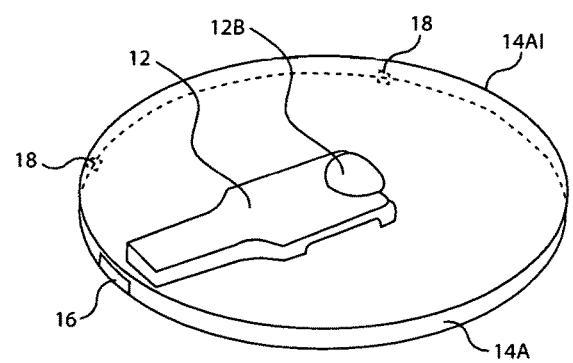
FIG. 2 is a partially exploded view of the USB media storage device shown in FIG. 1.

The partially exploded view of FIG. 2 shows that the housing 14 of the USB media storage device 10 comprises a bottom 14A and a top 14B. The bottom 14A of the housing 14 comprises a skirt 14A1 having the slot 16 through which the connector 12A of the USB flash drive 12 is selectively extended and retracted, as shown in FIGS. 1 and 2, respectively. The housing 14 also comprises a top 14B having an aperture 14C to enable access to a slider 12B of the USB flash drive 12 to selectively extend and retract the USB connector 12A.

Referring to FIG. 2, the top 14B of the housing 14 is secured to the bottom 14A. Preferably, one or more clasps 18 are provided interior of the skirt 18 to attach the top 14B to the bottom 14A. The clasp(s) 18 may be formed integrally with the bottom 14A or affixed to the bottom.

FIG. 3 shows an exploded view of the USB media storage device 10. As shown in FIG. 3, the bottom 14A of the housing 14 comprises rails 14C and 14D to mount the USB flash drive 12 in the housing 14. As shown in FIG. 3, the USB media storage device 10 preferably comprises a faceplate 20 which may be printed with an image or other information to indicate the content stored on the USB media storage device.

Referring to FIG. 4, top elevational views and a side elevational view of the USB media storage device 10 are shown. FIG. 4A shows the connector 12A of the USB flash drive 12 in the retracted or closed position. FIG. 4B shows the connector 12A of the USB flash drive 12 in the extended or open position. FIG. 4C shows a side view with the connector 12A of the USB flash drive 12 in the extended or open position. Various preferred dimensions are also shown in FIG. 4.

Figure 5:
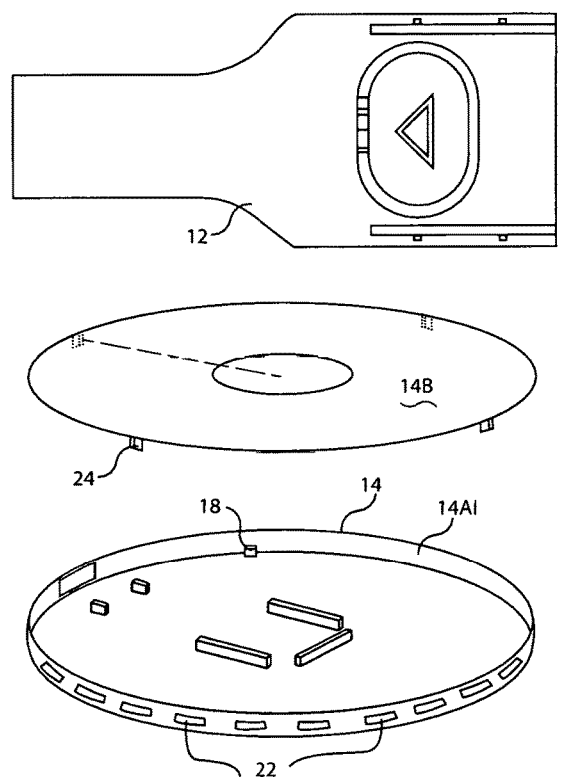
FIG. 5 shows details of the USB flash drive and housing comprising the USB media storage device in accordance with another example of the present invention.
Figure 5:
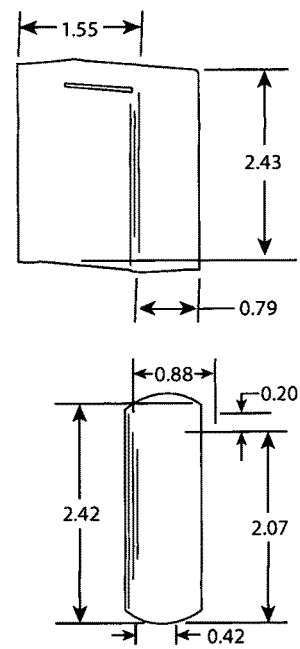

FIG. 5 shows another example of the USB media storage device 10 in accordance with the present invention. As shown in FIG. 5, a plurality of lighting elements 22 such as light emitting diodes (LEDs) may be mounted in the skirt 14A1. The lighting elements may be powered by a battery (not shown) mounted in the housing 14. FIG. 5 also shows details of the clasps 18 of the bottom 14A and clasps 24 of the top 14B of the housing 14 to attach the top to the bottom.

Figure 6:
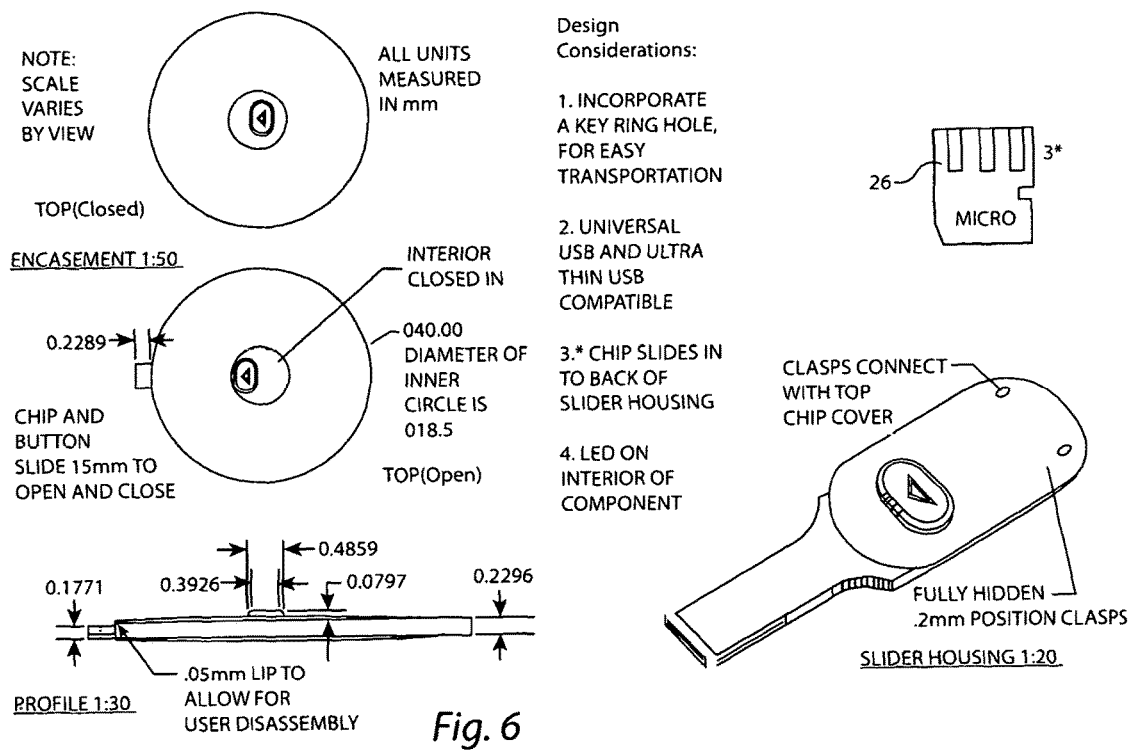
FIG. 6 shows additional details of the USB flash drive and housing comprising the USB media storage device shown in FIGS. 4 and 5.

FIG. 6 shows additional details of the USB flash drive 12 and housing 14 comprising the USB media storage device 10 shown in FIGS. 4 and 5. As also shown in FIG. 6, the USB flash drive 12 preferably comprises an LED 26 which is illuminated when the USB connector 12A of USB flash drive 12 is connected to a digital media player (not shown).

The media stored on the USB flash drive 12 is preferably copy protected to prevent piracy of the content stored on the USB flash drive. Various techniques including encryption may be utilized to prevent copying.

The examples described above are provided by way of example only, and various modifications which will be apparent to persons skilled in the art are contemplated. Accordingly, the scope of the present invention can only be ascertained with reference to the appended claims.

What is claimed is:

1. A USB media storage device, comprising:
   a USB flash drive having a USB connector and a slider to selectively extend and retract the USB connector; and
   a housing for the USB flash drive comprising a circular bottom having an upwardly extending cylindrical skirt disposed at the circumference of the bottom and further comprising a circular top adapted to be attached opposite to the bottom with the skirt between the top and the bottom, the top having an aperture through which to access the slider of the USB flash drive contained in the housing to selectively extend and retract the USB connector, the bottom of the housing having rails to mount the USB flash drive in the housing and further having a slot in the skirt through which the USB connector is actuated by the slider to selectively extend and retract the USB connector through the slot in the skirt.

2. The USB media storage device of claim 1 wherein the top and bottom of the housing further comprise clasps to interconnect the top and bottom of the housing.

3. The USB media storage device of claim 1, further comprising lighting elements mounted on the skirt of the bottom of the housing.

4. The USB media storage device of claim 1, further comprising a circular faceplate mounted to the bottom of the housing.

5. The USB media storage device of claim 1, further comprising copy protection for media stored on the USB flash drive.

* * * * *